(12) United States Patent
Hanchett

(10) Patent No.: US 6,834,301 B1
(45) Date of Patent: Dec. 21, 2004

(54) SYSTEM AND METHOD FOR CONFIGURATION, MANAGEMENT, AND MONITORING OF A COMPUTER NETWORK USING INHERITANCE

(75) Inventor: Paul F. Hanchett, Gresham, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 683 days.

(21) Appl. No.: 09/708,927

(22) Filed: Nov. 8, 2000

(51) Int. Cl.[7] .............................................. G06F 15/173
(52) U.S. Cl. ..................... 709/223; 709/203; 709/220; 709/224; 709/226; 710/17; 713/1; 713/201; 717/173; 717/175; 717/178; 707/1; 707/9; 705/1; 345/733
(58) Field of Search ................................ 709/223, 220, 709/226, 203, 224; 707/1, 9; 710/17; 713/201, 1; 717/173, 175, 178; 345/733; 705/1

(56) References Cited

U.S. PATENT DOCUMENTS

| | | | | |
|---|---|---|---|---|
| 5,742,829 A | * | 4/1998 | Davis et al. ................. | 717/178 |
| 5,745,879 A | * | 4/1998 | Wyman ........................ | 705/1 |
| 5,859,978 A | * | 1/1999 | Sonderegger et al. ....... | 709/226 |
| 5,878,415 A | * | 3/1999 | Olds ............................. | 707/9 |
| 5,978,594 A | * | 11/1999 | Bonnell et al. .............. | 710/17 |
| 6,006,035 A | * | 12/1999 | Nabahi ........................ | 717/175 |
| 6,041,347 A | | 3/2000 | Harsham et al. ............ | 709/220 |
| 6,047,312 A | * | 4/2000 | Brooks et al. .............. | 709/203 |
| 6,061,684 A | * | 5/2000 | Glasser et al. .............. | 707/9 |
| 6,061,795 A | * | 5/2000 | Dircks et al. ............... | 713/201 |
| 6,151,709 A | * | 11/2000 | Winkel ........................ | 717/173 |
| 6,157,378 A | * | 12/2000 | Bormann et al. ........... | 345/733 |
| 6,185,613 B1 | * | 2/2001 | Lawson et al. ............. | 709/224 |
| 6,205,476 B1 | * | 3/2001 | Hayes, Jr. ................... | 709/220 |
| 6,466,973 B2 | * | 10/2002 | Jaffe ............................ | 709/223 |
| 6,490,619 B1 | * | 12/2002 | Byrne et al. ................ | 709/223 |
| 6,651,047 B1 | * | 11/2003 | Weschler, Jr. .............. | 707/1 |
| 2002/0112150 A1 | * | 8/2002 | Lawing et al. .............. | 713/1 |

OTHER PUBLICATIONS

"Trend Virus Control System Administrator's Guide," Apr. 20, 1998, Trend Micro Incorporated.

* cited by examiner

*Primary Examiner*—Jack Harvey
*Assistant Examiner*—Hai V. Nguyen
(74) *Attorney, Agent, or Firm*—Zilka-Kotab, PC; Christopher J. Hamaty

(57) ABSTRACT

A system and method using inheritance for the configuration, management, and/or monitoring of computer applications and devices via a computer network are disclosed. The method generally comprises calculating control settings to be enforced by an end node corresponding to a device of the network of devices, the control settings being calculated by the corresponding device. The control settings to be enforced by the end node are applicable to the device and the resources of the device. The calculation is performed by the end node or device by accessing data stored in a network directory defining a hierarchical tree structure containing nodes corresponding to the network of devices and defining control settings corresponding to and to be enforced upon the resources available to the devices. The control settings corresponding to the resources of each device are selectively inherited down the hierarchical tree structure of the network directory.

22 Claims, 4 Drawing Sheets

SYSTEM AND METHOD FOR CONFIGURATION, MANAGEMENT, AND MONITORING OF A COMPUTER NETWORK USING INHERITANCE

BACKGROUND OF THE INVENTION

1. Field of the Invention

The present invention relates generally to a system and method for the configuration, management, and/or monitoring of applications and devices of a computer network using inheritance. More specifically, a system and method for the configuration, management, and/or monitoring of computer applications and devices of a computer network using inheritance and accessing a control store such as stored at a central server are disclosed.

2. Description of Related Art

A computer network linking together numerous computers and various other devices becomes increasingly more difficult, time-consuming, and costly to manage as the number and complexity of computers or other devices on the network increases. In addition, the devices on the network may be located in distant geographic locations, thereby adding to the complexity and cost for management of the network.

Management of the devices in a computer network may involve the setting of various configuration parameters for each user, device, software, application, or other electronic resources installed on the devices or otherwise available via the devices. Such configuration may include configuring the way the resources may communicate with each other as well as how the resources may be shared, accessed, secured, limited, updated, scanned, backed up, etc.

For example, it may be desirable to manage virus protection on a computer network by managing each computer as a separate entity. Typically, a network administrator is responsible for the management of the computer network. The network administrator may install the virus protection software application on a first server or device and configure the software application. The configuration for the first device may be copied for installation on all other devices. With each change or upgrade, the process must be repeated for each device on the network. Such a process is very tedious and time-consuming, particularly when the devices are at different physical sites. In addition, the large number of computers and sites in a large network under management increases the complexity of the process may increase disproportionately.

Furthermore, within a network, it is often desirable or necessary to specially configure certain individual devices to account for differences among the different devices such as in hardware and/or usage. With mass copying of a master configuration file, particularly in a subsequent modification to the configuration and/or update of the application, any customizations on individual machines are lost and an administrator must correctly add the customizations back manually. As is evident, initial installation and subsequent updating of the application and/or modifications to the control settings can be tedious and costly. Any customizations are even more difficult with increased risks for error and complexity in management.

Thus, it is desirable to provide a system and method that more effectively and efficiently configure, manage, and/or monitor devices of a network.

SUMMARY OF THE INVENTION

A system and method using inheritance for the configuration, management, and/or monitoring of computer applications and devices of a computer network are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system for management of a network of devices and resources available to the devices via a computer network generally comprises a network directory defining a hierarchical tree structure containing nodes corresponding to the network of devices and defining control settings corresponding to and to be enforced upon the resources available to the devices, a directory server, and an end node. The directory server is in communication with the network directory to facilitate accessing data from and storing data to the network directory, the data relating to the nodes of the hierarchical tree structure corresponding to the devices and to the control settings corresponding to the resources. The end node corresponds to each device in the network of devices and resources corresponding to the device, the end node being in communication with the directory server and the resources corresponding to the device, the end node being adapted to enforce the control settings corresponding to the resources contained in the network directory. The control settings corresponding to the resources of each device are selectively inherited down the hierarchical tree structure of the network directory and wherein the control settings are determined at each end node.

The method for management of a network of devices and resources available to the devices via a computer network generally comprises, for each device of the network of devices, calculating control settings to be enforced by the device upon the resources corresponding to the device. The calculating is performed by the device by accessing data stored in a network directory defining a hierarchical tree structure containing nodes, each node corresponding to a device of the network of devices and defining control settings corresponding to and to be enforced upon the resources available to the corresponding device and wherein the control settings corresponding to the resources of each device are selectively inherited down the hierarchical tree structure of the network directory.

A computer program product for management of a network of devices and resources available to the devices via a computer network generally comprises, for each device of the network of devices, computer code that calculates control settings to be enforced by the device upon the resources corresponding to the device, wherein the calculating is performed by the device by accessing data stored in a network directory defining a hierarchical tree structure containing nodes, each node corresponding to a device of the network of devices and defining control settings corresponding to and to be enforced upon the resources available to the corresponding device and wherein the control settings corresponding to the resources of each device are selectively inherited down the hierarchical tree structure of the network directory, and a computer readable medium that stores said computer codes.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A network configuration, control, and management system and method using inheritance for the configuration, management, and/or monitoring of computer applications and devices via a computer network are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Overview of System for Network Configuration, Control, and Management

Figure 1:
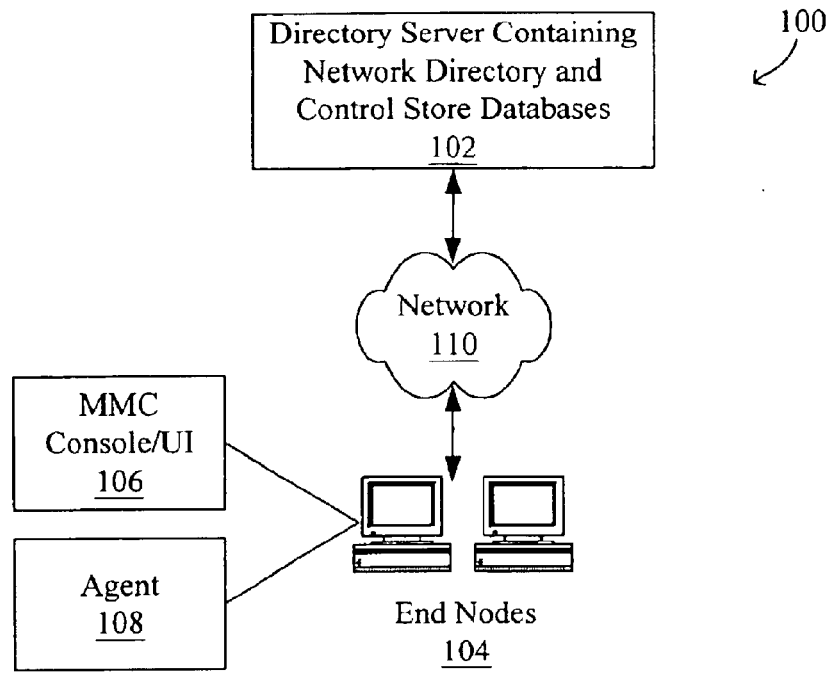
FIG. 1 is a block diagram illustrating an overview of the computer network management system.

FIG. 1 is a block diagram illustrating an overview of the system 100 for network configuration, control, and management. As shown, the network management system 100 generally comprises a network directory server 102 in communication with various nodes, including end nodes 104, of the network directory via a network 110.

The network directory server 102 contains a network directory database and a control store database. The network directory or database may be, for example, an LDAP (Lightweight Directory Access Protocol) database. The network directory structures the various nodes of the network into a hierarchical tree structure having end nodes as leaves, as will be described in more detail below with reference to FIG. 2. The control store database contains control information such as configuration data applicable at the various end nodes. In particular, each end node calculates the set of applicable control data from data in the control store database using inheritance as will be discussed infra.

The network directory server 102 is a central management component of the network management system 100. Preferably, most control or management data for the for the end nodes 104 of the network are stored in a centralized repository such as the LDAP directory or database. The network directory 104 may be the backend database for the network management system 100 that includes an LDAP database serving as a centralized repository of directory information and control data. It is to be noted that the directory database may reside with the directory server 100 or at any other suitable location. Alternatively, such control data may be stored in a distributed manner among the various nodes of the network.

Each end node 104 includes a user interface 106 such as an MMC (Microsoft Management Console) console and an agent 108. The agent 108 generally refers to a thin client or a small program that runs in the background of a client device such as a desktop computer. Client device refers generally to any machine that is managed by the network management system, typically a desktop or personal computer.

Each end node 104 corresponds to a specific set of control data and may perform various tasks in accordance with the control data. The end node 104, in conjunction with the directory server 102, may monitor and record systems properties, record events, install and uninstall software, schedule executions, perform scheduled executions, and/or enforce control parameters as defined by the control data.

The management console 106 is a user interface (UI) of the network management system 100 and may be an MMC snap-in. The management console 106 allows a network administrator or other personnel to perform various tasks such as modifying control data at various nodes of the hierarchical network tree. The management console 106 typically does not persist any data locally other than network administrator login information.

Once the network administrator successfully logs in via the management console 106, the management console 106 retrieves data from the directory server 102 via the network 110. The management console 106 may display various retrieved data in a display. For example, the management console 106 may display details of the hierarchical network directory tree. The management console 106 may alternatively or additionally enable the network administrator to select a node such as an end node and display applications under management for the selected node. Examples of applications under management by the network management system 100 may include virus scanning software and/or any other software product. Additional information regarding a selected application under management may also be displayed. Any modifications to the control data may be made via the management console 106.

The agent 108 at each end node 104 may collect information regarding the applications under management and transmit the information to the directory server 102 via the network 110 for storage such as in the control store database or a log. Control information for an application under management generally refers to any information utilized to control the properties, tasks, and/or configuration of the application.

The agent 108 at each end node 104 facilitate in enforcing the control data upon the applications under management at the local client device. Such enforcement may include configuration of the corresponding application, scheduling tasks to be executed by the corresponding application at the local client device, etc.

The directory server 102 and the local client devices at the end nodes 104 may utilize any suitable communication scheme to communicate therebetween via the network 110. In addition, the management console 106 and the agent 108 may utilize any suitable communication scheme to communicate with the local client device at the end nodes 104. For example, a secure communication protocol may be utilized.

The network management system 100 utilizes the network directory such as one provided by an NDS (Network Directory Services) or the LDAP directory 104 to provide a hierarchical network tree structure for inheriting control data such as control setting. Control settings may also be referred to as polices such as configuration values and scheduled tasks. In other words, the network directory provides a hierarchical network tree structure for inheriting control data down to the individual applications on local client devices. Inheritance generally refers to a hierarchy of properties and settings in which the setting closer to the object being managed but higher than the object itself in the hierarchy have a higher priority than those further away. Thus a task setting set high in the directory tree can be replaced by a closer/lower setting. This hierarchy may be utilized to implement management by exception on the network in which the administrator may set general rules and then set more specific rules on a case by case basis.

Thus, by using inheritance and utilizing the actual network directory, any setting can be established at any level in the directory tree. By setting a new value at a lower level, a higher, more general control setting can be overridden. By setting a control setting higher in the tree, it applies to more of the nodes in the network. At the same time, higher level control settings can be easily changed without accidentally disturbing finer controls established closer to the point of applications because lower level control settings overlay corresponding portions of high level control settings.

By utilizing the network directory, the network managed by the network management system 100 may be self-healing when modifications to the network are made. For example, if a local client device is moved from one site to another, the local client device searches up the network control directory tree for the closest administrator or administrative user. That closest administrator is typically the one most closely associated with the physical site being managed. Once the local client device locates its closest administrator, the applicable control settings may be enforced and implemented upon the local client device by the network management system 100.

The network management system 100 provides a management scheme based on inheritance of properties down the local hierarchical network management structure. The network management system 100 may utilize an existing network management structure to distribute control settings and information. In addition, a single set of entries at the top of the management structure effects control or management for the entire network tree. A local administrator can make adjustments to the control settings set by the network administrator or by any administrator higher up in the directory tree as necessary and/or allowable by the network security limits. Typically, network security is managed within the network rather than within the user or management console of the product being managed.

Such a scheme provides the advantage that additional servers or management consoles are not necessary to effect the control settings, although additional servers or management consoles may be utilized. In addition, multiple management consoles may exist on the network without the multiple consoles conflicting each other.

As is evident, the use of inherited control settings and the inheritance of those settings down the network directory tree structure allows the network management task easier, less complex, and more predictable.

Network Directory

The network or LDAP directory contains nodes making up components of the network under management. Each network directory node may be categorized as a group, user, or computer. The network administrator may configure the network directory to represent the corporate network. In one example, each group may contain any combination of users, computers, and/or other groups as its child nodes. Each user may contain computers and computer are the leaf nodes with no child.

The network directory information is typically stored in a root in the network directory, namely the directory server 102. In one embodiment, a set of default control setting values for each application under management may be stored as the directory root control setting values from which all nodes under it can inherit by default. The control setting values may be stored in a separate root and links to these control setting values may be stored in the actual directory nodes.

It is noted that a central network directory need not be preexisting. For example, a designated central server may synthetically derive or otherwise compute the hierarchical network data based on topology information relating to the computer network. However, where the central server contains preexisting hierarchical network data, the network management system may simply utilize such hierarchical data, thereby resulting in synergistic effects.

Management Console/User Interface 106

The management console 106 allows the network administrator or other personnel to perform various tasks such as modifying the network directory by adding and/or deleting groups, users, and/or computers from the network, configuring the network directory, configuring and managing applications under management by setting control setting values, which may include configuring applications under management, scheduling tasks to be performed, monitoring events and setting tasks.

The management console/user interface 106 may comprise an MMC framework and a console snap-in. In particular, the console snap-in may include various optional modules such as user authentication, directory management, control setting management, client device/user/group properties, software management, event management, task scheduling, server event viewer, directory search, site management, administrator configuration, and end node rollout modules.

Control Settings

The control settings are preferably configurable to varying degrees of granularity. Granularity generally refers to a measure of how small an adjustment can be made to an existing rule without changing another setting or rule, whether related or not. The granularity of the control settings is an important consideration in the set up and configuration of the network management system. If the granularity is not sufficiently fine, there may be an undesirable day-to-day need to fine tune the network that may cause inadvertent blockages to inheritance. Such blockages can prevent high level changes intended to be migrated down throughout much or all of the directory tree from migrating to controlled objects. The blockages can thus cause the applications under management to be improperly managed. In addition, such blockages may not be easily detected and corrected. Alternatively, if the granularity is too fine, then control settings may need to be repeated as they are made, reducing the efficacy of the network management system and resulting in additional steps for the network administrator.

Generally, broad control settings are set higher in the tree while lower level control settings are set at the level of the individual local device. For a virus control software managed by the network management system 100, for example, a broad control setting may be a control setting to scan all executable files for viruses, clean the file if possible or quarantine the file if the file cannot be cleaned upon detecting a virus, and send infection reports to the network administrator by default. A mid-level control setting may be a control setting to report all infections to the local administrator and may be set at the location level. A low-level control setting may be a control setting to delete any infected files of a specific user or local client device that may be set at the level of the specific user and/or specific local client device.

A given application under management at an end node typically has multiple ancestors or parents along its path to the root node of the network hierarchical control tree. With configurable granularity, it is possible for that application under management to inherit one control setting from one parent and a control setting from another parent, regardless of whether the two control settings are related.

Figure 2:
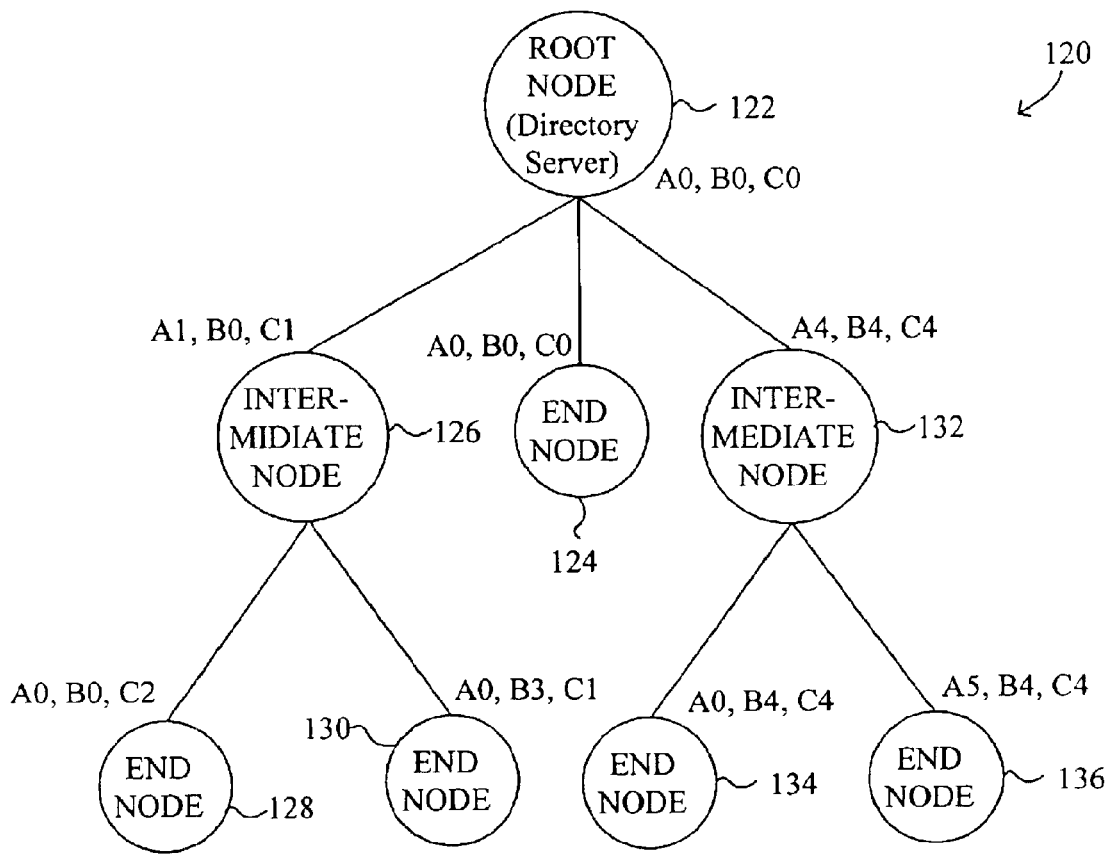
FIG. 2 is a schematic illustrating a simplified hierarchical network tree and the control setting values applicable to each node of the tree.

FIG. 2 illustrates a simplified example of a hierarchical network tree 120 having nodes. In particular, the hierarchical network tree 120 has a root node 122, typically the directory server. Immediately below the root node 122 is an end node 124 and two first level parents or intermediate nodes 126, 132. The intermediate node 126 on the left has two end nodes 128, 130 and the other intermediate node 126 on the right has two end nodes 134, 136. The first level may correspond to various physical locations of the computer network. For example, the intermediate node 126 on the left may correspond to a facility of the network in one city and the other intermediate node 132 may correspond to a facility of the network in another city. Additional levels may be structured in the hierarchical network tree such as a second intermediate level (not shown) that corresponds to various departments at each location.

In the example of FIG. 2, each end node is configured to have three configurable control settings A, B, and C. It is to be noted that although each node need not have the same set of control settings as any other node, each node typically have some of the same or overlapping control settings as its immediate parent even if the values for these overlapping control settings are not the same.

The root node is configured to have control setting values A0, B0, and C0. The end node 124 immediately below the root node may inherit all the control setting values A0, B0, and C0 from the root node. Thus, if some of all of the control setting values were modified in the root node, such modified values would be automatically reflected in the end node 124.

The intermediate node 126 on the left is configured to have control setting value B0 inherited from the root node as well as non-inherited control setting values A1 and C1, different from the corresponding control settings A0 and C0 of the root node. Thus, only modification of the control setting value for B will be automatically reflected in the intermediate node 126.

The end node 128 immediately below the intermediate node 126 is configured to have control setting values A0, B0, and C2. In other words, the values for control settings A and B are inherited from the root node 122 and the non-inherited control setting C has a value of C2. As is evident, modifications in the control setting values for A and B at the root node 122 would automatically be reflected in the end node 128.

The other end node 130 immediately below the intermediate node 126 is configured to have control setting values A0, B3, and C1. In other words, the values for control settings A and C are inherited from the root node 122 and the intermediate node 126, respectively. As such, modifications in the control setting values for A and C at the root node 122 and at the intermediate node 126, respectively, would automatically be reflected in the end node 130. In addition, the end node 130 contains a non-inherited control setting value of C1, configured independent of any of its ancestors or parents, namely, intermediate node 126 and root node 122.

The intermediate node 132 is configured to have all non-inherited control setting values A4, B4, and C4, independent from any control setting values of its parent. The end node 134 immediate below intermediate node 132 is configured to have control values A0, B4, and C4. Thus, end node 134 inherits the value A0 for control setting A from the root node 122 and the values B4 and C4 for control settings B and C from the intermediate node 132. The other end node 136 immediate below intermediate node 132 is configured to have control values A5, B4, and C4.

Thus, end node 136 inherits the values B4 and C4 for control setting B and C from the intermediate node 132 and the control setting value A5 is configured independent of any of its ancestors or parents, namely, intermediate node 126 and root node 122.

It is noted that although FIG. 2 designates node 122 as the root node for the hierarchical network, the "root node" for purposes of calculating control parameters or setting values utilizing inheritance for a given node may be the highest parent node from which the given node inherits. In particular, because the intermediate node 132 does not inherit from any of its parent node(s), the intermediate node 132 is the "root node" for purposes of calculating the control setting values for the intermediate node 132. Similarly, because the end node 136 does not inherit from the network directory root node 122 and because highest parent node form which the end node 136 inherits is the intermediate node 132, intermediate node 132 may be the "root node" for purposes of calculating the control setting values for end node 136.

Depending upon the configured granularity, the application under management may inherit any or all characteristics from any combination of its parent nodes, i.e., the root and the first and second level parents. For example, the application under management may inherit characteristics A0, B2, and C1 from the root, the second level parent, and the first level parent, respectively. It is noted that this example is simplified to more clearly illustrate that characteristics may be inherited from a selected combination of parents. The granularity of the inherited characteristics may vary depending upon the particular characteristic being configured.

End node 104

Event data, such as "Virus Found" and "File Cleaned," may be sent by the agent of the node from the application under management to the directory server 102 for storage. The end node 104 collects and stores the event data and sends the stored event data to the directory server 102 via the network 110.

Calculation of Control Setting Values Using Inheritance

Figure 3:
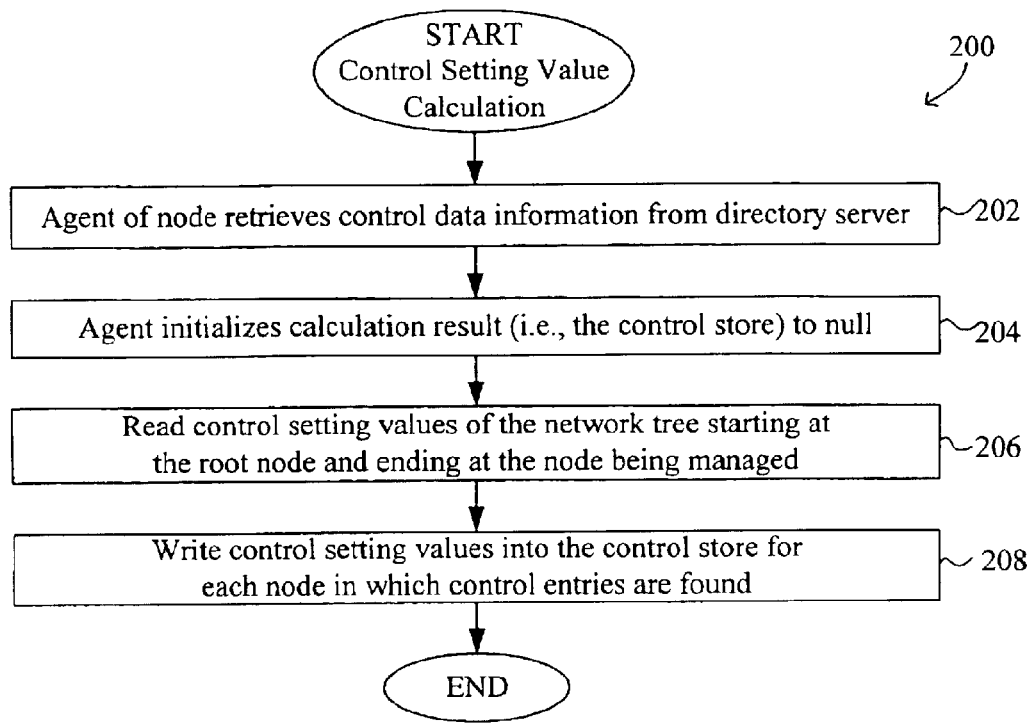
FIG. 3 is a flow chart illustrating a process for calculating control setting values using inheritance.
Figure 4:
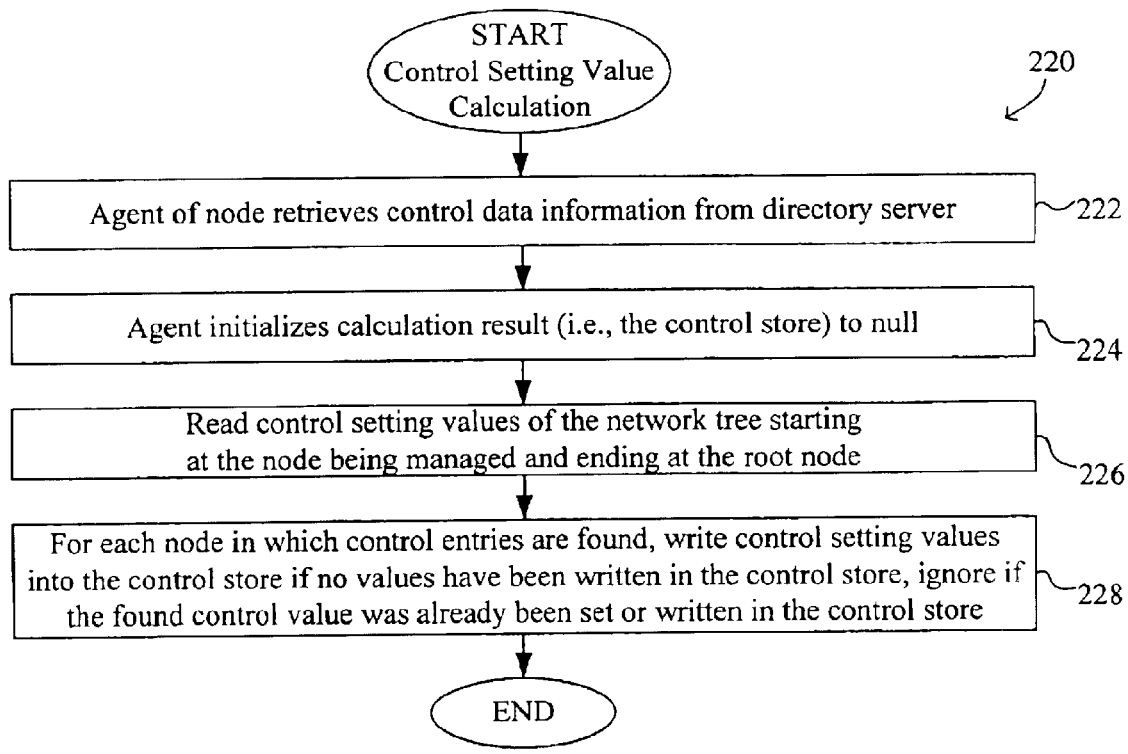
FIG. 4 is flow chart illustrating an alternative process for calculating control setting values using inheritance.

Any suitable method may be utilized to calculate the control setting values using heritage or inheritance of an object in the network directory tree. FIGS. 3 and 4 are flow chart illustrating exemplary processes 200, 220 for calculating control setting values using inheritance. It is to be noted that, although the processes are described as being carried out by the local agent (such as the management console) of the node to which the control setting values are applicable, the calculation may be performed by a remote agent of the node. In particular, the local or remote agent of the client device associated with the node may access control data from the network directory via the network in order to calculate the control setting values. The calculations using inheritance may be dynamic and carried out by the agent or the management console.

With respect to the process 200 shown in FIG. 3, the local or remote agent of the node retrieves hierarchical data from the directory server at step 202. The agent of the node then calculates the control setting for the node and/or application under management based on the location of the end node within the hierarchy. In particular, at step 204, the agent initialized the calculation result (i.e., the control store) to null. At step 206, the control setting values of the network tree are read starting at the root node and ending at the node being managed. As noted above, the "root node" may be either the root node of the directory network or, for higher efficiency in the calculations, the "root node" may be the root node for purposes of calculating control parameters utilizing inheritance.

At step 208, for each node in which control entries are found, these found control setting values are written into the control store. In writing the most recently found control values, previously written conflicting control values in the control store are typically overwritten. After the calculation is complete, the result is a cumulative inheritance of the object. This method of calculating the inheritance is relatively simple to implement.

With respect to the process 220 shown in FIG. 4, the local or remote agent of the node retrieves hierarchical data from the directory server at step 222. The agent of the node then calculates the control setting for the node and/or application under management based on the location of the end node within the hierarchy. In particular, at step 224, the agent initialized the calculation result (i.e., the control store) to null.

At step 226, the control setting values of the network tree are read starting at the node being managed and ending at the root node. Again, the "root node" may be either the root node of the directory network or, for higher efficiency in the calculations, the "root node" may be the root node for purposes of calculating control parameters utilizing inheritance. At step 228, for each node in which control entries are found, these found control setting values are written into the control store if no values have been written in the control store. However, if the found control value was already been set or written in the control store, the located control setting is ignored. In other words, the previously written conflicting control values prevail over more recently located control values. The traversal up the directory tree from the node being managed is complete after all possible values have been set or after the root is reached and read. It is noted that it may be desirable to only inherit from a certain number of levels above the managed object or to stop at some defined network boundary. Although this method of calculating the inheritance is relatively more complex than the previous example, this method of calculating the inheritance opportunities to minimize and optimize network accesses.

To calculate inheritance for users, the control values or settings of the network tree are first determined for the local client device. The device control values may then be overlaid that with the inheritance of the user. Typically, the device inheritance includes settings for the device and settings pertaining to users in the device's container. In the absence of other control settings, the control setting in effect at the device would also apply to the users. However, if a different control setting for the user or somewhere on the user path exists, that different control setting will override the corresponding components of the device's control settings as necessary.

In the case where no value has been set for a particular parameter, a default value may be supplied by the management system. Alternatively although not preferred, the object being managed may supply the default values for missing parameters.

Depending upon the object being managed and the intended use of the information, there may be multiple paths of inheritance for obtaining control store information. The particular path chose affect how control store information is inherited.

In a virus protection application under management software example, on-access scans are associated with a user such that if a user accesses a remote server and attempts to write an infected file, the user's local administrator should be notified. If the same user accesses a remote server and tries to read an infected file, then the remote server's administrator, the infected file's owner and/or the administrator of the file's owner may be notified of the infection. Alternatively, on-demand-scans of local files are tasks initiated at the local client device on a predetermined schedule. Typically, only a computer or other device, e.g., the local client device that may be shared by several users, is associated with on-demand-scans task. Thus, all components of the on-demand-scans control are typically be inherited from the path between the root and the node being managed.

Figure 5:
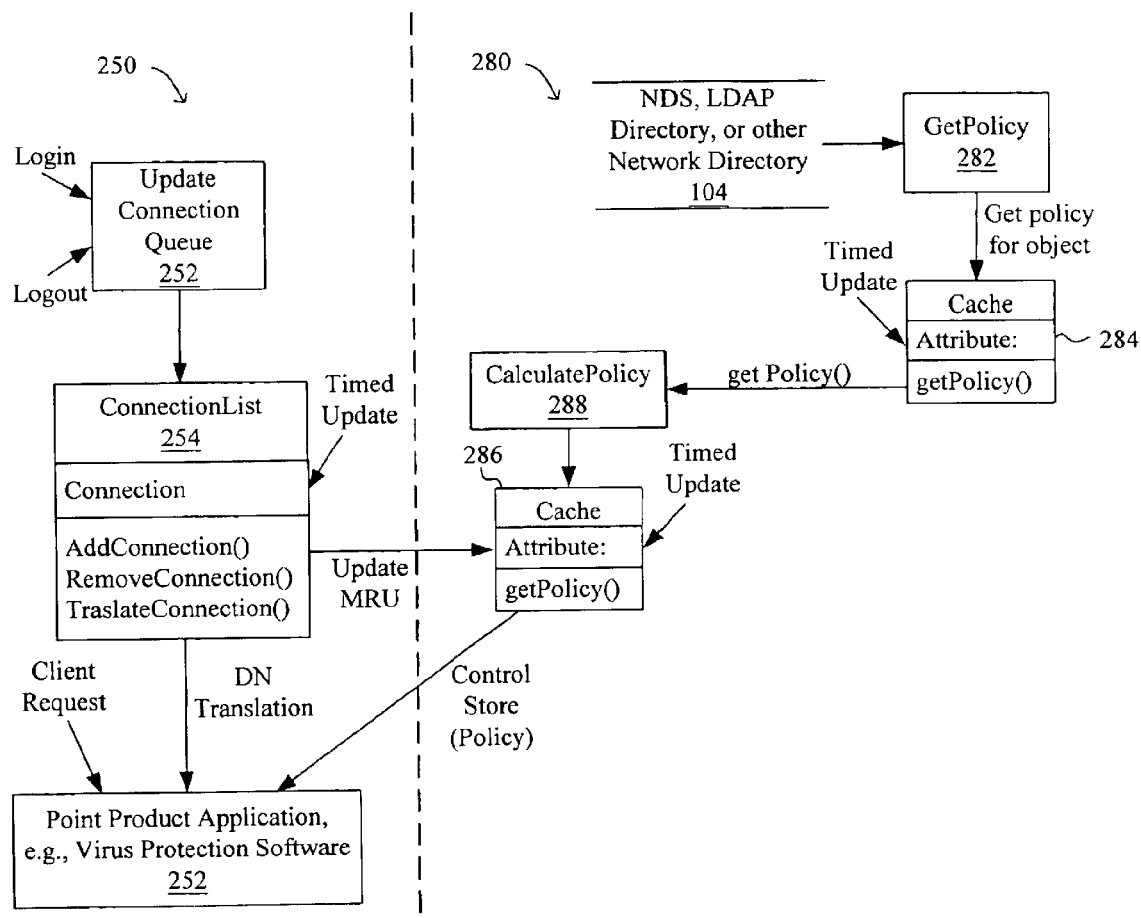
FIG. 5 is a block diagram illustrating one exemplary implementation for an inheritance based control store.

FIG. 5 is a block diagram illustrating one exemplary implementation for an inheritance based control store of the network management system. The implementation includes a support logic 250 that may be added to a application under management to support hierarchical management and a cache system 280 that facilitates in minimizing or reducing the load on the network management system and in providing quick access to predetermined control settings that may be necessary to meet the time constraints of, for example, on-access scans of a virus protection application under management software.

The support logic 250 may maintain a connection queue 252 that is updated upon a user login or a user logout. The connection queue 252 is in communication with a connection list 254 that maintains the list of connections and is adapted to execute timed updates. The connection list 254 may include various function calls such as add, remove, and/or translate connection. The connection list 254 actively observes for connections to the server and initiates creation of missing control settings as needed to reduce the latency of information. The connection list 254 is also in communication with a application under management application 252 such as a virus protection software. The application under management application 252 receives DN translations from the connection list 254 as well as client requests.

The cache system 280 includes a get policy component 282 that obtains the relevant policies for the object being managed from a network directory 104 such as an NDS, LDAP Directory, or other Network Directory. The cache system 280 also includes a first and a second cache unit 284, 286 as well as a calculate policy component 288. The calculate policy component 288 calculates or otherwise determines inheritance as discussed above with information received from the first cache 284. The calculate policy component 288 transmits the calculated inheritance to the second cache 286. The other components of the cache system 280 generally do not calculate the inheritance but deal with pre-calculating inheritance values for rapid access while keeping the load on the network directory service low.

Processed data from the get policy component 282 is cached in the first policy cache 284 such that the processed data is not continually re-read from the network directory 104 and re-parsed to verify whether the data has been modified. The configuration stored in the network directory 104 preferably includes a "Last Changed" time stamp. When the configuration is read, preferably on an object by object basis, the configuration is parsed and stored in the first policy cache 284 as a list of policies with a "Last Checked" time stamp as well as the "Last Changed" time stamp. The timed update causes the first policy cache 284 to be checked for policies that may be too old or otherwise stale. Policy objects generally will only be created or deleted at update time. Any policies stored in the first policy cache 284 that are stale are checked against the "Last Changed" time stamp in the network directory 104. Once checked, the "Last Checked" time stamps corresponding to such policies are updated. If it is determined that the policy in the network directory 104 has changed, that policy is also updated in the first policy cache 284.

The second policy cache 286 stores the pre-determined inherited policies that pertain to each active connection. When a new connection is established such as when a user logs in, the second policy cache 286 stored the calculated inherited policy for that connection. The "Last Checked" and the "Last Changed" timestamps are stored with the calculated policy. Periodic timed updates performs checks to ensure that the data has not become stale. If one of the objects contributing to the current calculated policy has changed, i.e., is more recent than the "Last Changed" timestamp, the policy is recalculated using the cached values by the calculate policy component 288.

Using a virus protection application under management software as an illustrative example, if the product needs to perform a scan, it concurrently asks for the policy object related to that connection. The returned policy object is passed as a parameter, along with any file information to the scanner and action handler as needed. The policy object contains the pre-calculated information regarding how the processing is to be handled. Rather than inquiring of the registry, the policy object is optionally inquired by means of a function call.

Figure 6:
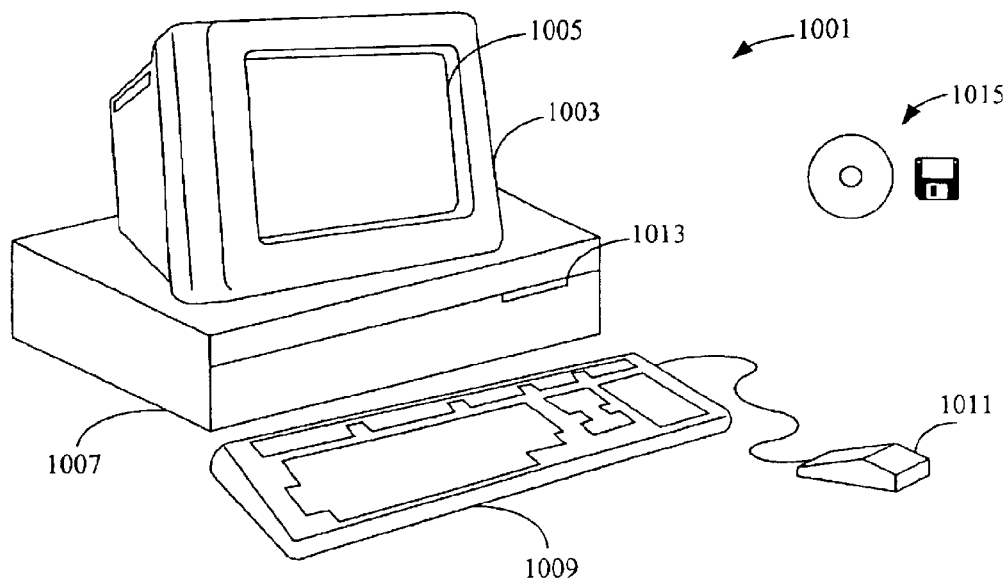
FIG. 6 illustrates an example of a computer system that can be utilized with the various embodiments of method and processing described herein.
Figure 7:
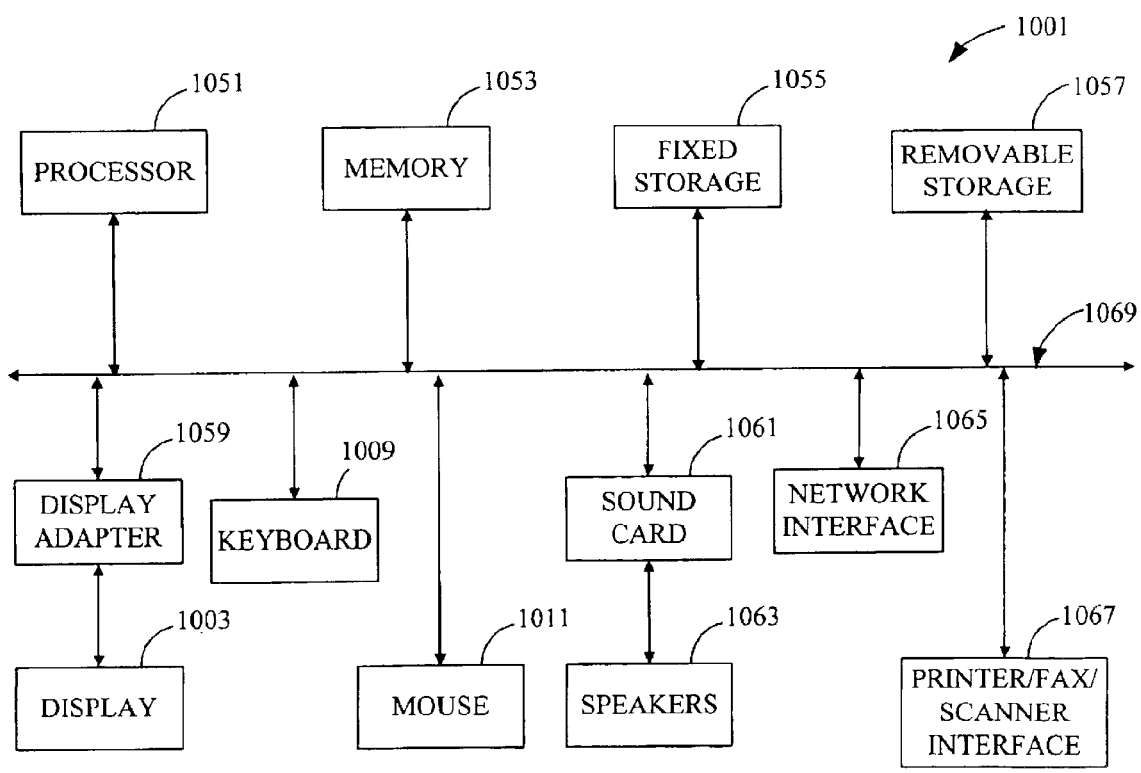
FIG. 7 illustrates a system block diagram of the computer system of FIG. 6.

FIGS. 6 and 7 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

The computer system 1000 may be illustrative of the computer system of the directory server and/or the local devices or end nodes.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A system for management of a network of devices and resources available to the devices via a computer network, comprising:
   a network directory defining a hierarchical tree structure containing nodes corresponding to the network of devices and defining control settings corresponding to and to be enforced upon the resources available to the devices;
   a directory server in communication with the network directory to facilitate accessing data from and storing data to the network directory, the data relating to the nodes of the hierarchical tree structure corresponding to the devices and to the control settings corresponding to the resources; and
   an end node corresponding to each device in the network of devices and resources corresponding to the device, the end node being in communication with the directory server and the resources corresponding to the device, the end node being adapted to enforce the control settings corresponding to the resources contained in the network directory,
   wherein the control settings corresponding to the resources of each device are selectively inherited down the hierarchical tree structure of the network directory and wherein the control settings are determined at each end node,
   wherein a management console is in communication with the network directory and the directory server for providing a user interface, the management console being adapted to selectively display the hierarchical tree structure and the control settings stored in the network directory,
   wherein at least one control setting is a scheduled task and wherein the end node causes performance of the task when the scheduled task is to be performed,
   wherein the scheduled task is an anti-virus-related task;
   wherein further included is a get policy component that obtains relevant policies, a first cache for caching an output of the get policy component, and a calculate policy component that calculates an inheritance with the output received from the first cache and transmits the inheritance to a second cache, wherein the information in the first cache is updated based on a time stamping;
   wherein broad control settings are set higher in the hierarchical tree structure while lower level control settings are set at a level of one of the devices.

2. The system for management of a network of devices and resources via a computer network according to claim 1, wherein the end node dynamically calculates the control setting of the selected node by reading the control settings of nodes along a path of nodes from a root of the hierarchical tree structure down to the selected node and wherein the end node overwrites previously written control settings upon reading conflicting control settings at each node along the path of nodes.

3. The system for management of a network of devices and resources via a computer network according to claim 1, wherein the end node dynamically calculates the control setting by reading from the control settings of the end node up to the control settings of a root of the hierarchical tree structure.

4. The system for management of a network of devices and resources via a computer network according to claim 1, wherein each control setting includes a configuration rule and the scheduled task.

5. The system for management of a network of devices and resources via a computer network according to claim 1, wherein the broad control settings require the scanning of all executable files for viruses, cleaning of the files if possible, quarantining of the files if the files can not be cleaned upon detecting a virus, and sending infection reports to a network administrator.

6. The system for management of a network of devices and resources via a computer network according to claim 5, wherein a mid-level control setting is set to report all infections to a local administrator.

7. The system for management of a network of devices and resources via a computer network according to claim 6, wherein the lower level settings require the deletion of infected files of said one of the devices.

8. A method for management of a network of devices and resources available to the devices via a computer network, comprising:
   for each device of the network of devices, calculating control settings to be enforced by the device upon the resources corresponding to the device;
   wherein the calculating is performed by the device by accessing data stored in a network directory defining a hierarchical tree structure containing nodes, each node corresponding to a device of the network of devices and defining control settings corresponding to and to be enforced upon the resources available to the corresponding device and wherein the control settings corresponding to the resources of each device are selectively inherited down the hierarchical tree structure of the network directory;
   wherein the hierarchical tree structure and the control settings stored in the network directory for one of the devices are selectively displayed by a management console, the management console being in communication with the network directory and the directory server, the management console providing a user interface at the corresponding device;
   wherein when the control setting is a scheduled task, further comprising causing performance of the task by the end node when the scheduled task is to be performed;
   wherein the scheduled task is an anti-virus-related task;
   wherein further included is a get policy component that obtains relevant policies, a first cache for caching an output of the get policy component, and a calculate policy component that calculates an inheritance with the output received from the first cache and transmits the inheritance to a second cache, wherein the information in the first cache is updated based on a time stamping;
   wherein broad control settings are set higher in the hierarchical tree structure while lower level control settings are set at a level of one of the devices.

9. The method for management of a network of devices and resources via a computer network according to claim 8, further comprising enforcing the control settings by the device upon the resources available to the device.

10. The method management of computer application via a computer network according to claim 9, further comprising dynamically calculating the control settings of a selected node of the hierarchical tree structure by the device.

11. The method management of computer application via a computer network according to claim 10, wherein the dynamic calculating includes reading control settings of nodes along a path of nodes from a root of the hierarchical tree structure down to the selected node and overwriting previously written control settings upon reading conflicting control settings at each node along the path of nodes.

12. The method management of computer application via a computer network according to claim 10, wherein the dynamic calculating includes reading control settings of nodes along a path of nodes from the control setting of the selected node up to the control settings of a root of the hierarchical tree structure.

13. The method of management of a network of devices and resources via a computer network according to claim 8, wherein each control setting includes a configuration rule and the scheduled task.

14. A method for management of a network of devices and resources via a computer network according to claim 8, further comprising selectively transmitting data from a software repository of the directory server to the device.

15. A computer program product for management of a network of devices and resources available to the devices via a computer network, comprising:
  for each device of the network of devices, computer code that calculates control settings to the enforced by the device upon the resources corresponding to the device, wherein the calculating is performed by the device by accessing data stored in a network directory defining a hierarchical tree structure containing nodes, each node corresponding to a device of the network of devices and defining control settings corresponding to and to be enforced upon the resources available to the corresponding device and wherein the control settings corresponding to the resources of each device are selectively inherited down the hierarchical tree structure of the network directory; and
  a computer readable medium that stores said computer codes;
  wherein the hierarchical tree structure and the control settings stored in the network directory are selectively displayed via a user interface;
  wherein when the control setting is a scheduled task, further comprising computer code that causes performance of the task by the end node when the scheduled task is to be performed;
  wherein the scheduled task is an anti-virus-related task;
  wherein further included is a get policy component that obtains relevant policies, a first cache for caching an output of the get policy component, and a calculate policy component that calculates an inheritance with the output received from the first cache and transmits the inheritance to a second cache, wherein the information in the first cache is updated based on a time stamping;
  wherein broad control settings are set higher in the hierarchical tree structure while lower level control settings are set at a level of one of the devices.

16. The computer program product for management of a network of devices and resources via a computer network according to claim 15, further comprising computer code that enforces the control settings upon the corresponding device and resources available to the device.

17. The computer program product for management of a network of devices and resources via a computer network according to claim 15, further comprising computer code that dynamically calculates the control setting of a selected node of the hierarchical tree structure by the corresponding device.

18. The computer program product for management of a network of devices and resources via a computer network according to claim 17, wherein the computer code that dynamically calculates includes computer code that reads control settings of nodes along a path of nodes from a root of the hierarchical tree structure down to the selected node and computer code that overwrites previously written control settings upon reading conflicting control settings at each node along the path of nodes.

19. The computer program product for management of a network of devices and resources via a computer network according to claim 17, wherein the computer code that dynamically calculates includes computer code that reads control settings of nodes along a path of nodes from the control settings of the selected node up to the control settings of a root of the hierarchical tree structure.

20. The computer program product for management of a network of devices and resources via a computer network according to claim 15, wherein each control setting includes a configuration rule and the scheduled task.

21. The computer program product for management of a network of devices and resources via a computer network according to claim 15, further comprising computer code that selectively transmits data from a software repository of the directory server to the device via the end node corresponding to the device.

22. A computer program product for management of a network of devices and resources available to the devices via a computer network, comprising:
  computer code that contains a network directory defining a hierarchical tree structure containing nodes corresponding to the network of devices and defining control settings corresponding to and to be enforced upon the resources available to the devices;
  computer code that facilitates communication between a directory server and the network directory to facilitate accessing data from and storing data to the network directory, the data relating to the nodes of the hierarchical tree structure corresponding to the devices and to the control settings corresponding to the resources;
  computer code that facilitates communication between the device and the directory server and the resources corresponding to the device, the device computer code being adapted to enforce the control settings corresponding to the resources contained in the network directory, wherein the control settings corresponding to the resources of each device are selectively inherited down the hierarchical tree structure of the network directory; and
  a computer readable medium that stores said computer codes;
  wherein the hierarchical tree structure and the control settings stored in the network directory are selectively displayed, and computer code that selectively displays is in communication with the network directory and the directory server and provides a user interface;
  wherein when the control setting is a scheduled task, further comprising computer code that causes performance of the task by the end node when the scheduled task is to be performed;
  wherein the scheduled task is an anti-virus-related task;
  wherein further included is a get policy component that obtains relevant policies, a first cache for caching an output of the get policy component, and a calculate policy component that calculates an inheritance with the output received from the first cache and transmits the inheritance to a second cache, wherein the information in the first cache is undated based on a time stamping;
  wherein broad control settings are set higher in the hierarchical tree structure while lower level control settings are set at a level of one of the devices.

* * * * *

UNITED STATES PATENT AND TRADEMARK OFFICE
CERTIFICATE OF CORRECTION

| | |
|---|---|
| PATENT NO. | : 6,834,301 B1 |
| APPLICATION NO. | : 09/708927 |
| DATED | : December 21, 2004 |
| INVENTOR(S) | : Hanchett |

Page 1 of 1

It is certified that error appears in the above-identified patent and that said Letters Patent is hereby corrected as shown below:

Col. 16, line 61, replace "undated" with -- updated --.

Signed and Sealed this

Twelfth Day of October, 2010

David J. Kappos
*Director of the United States Patent and Trademark Office*